(12) United States Patent
Kimura et al.

(10) Patent No.: US 8,422,496 B2
(45) Date of Patent: Apr. 16, 2013

(54) BROADCAST-CONTENT TRANSMITTING APPARATUS, BROADCAST-CONTENT RECEIVING APPARATUS, BROADCAST-CONTENT TRANSMITTING METHOD, BROADCAST-CONTENT RECEIVING METHOD, AND PROGRAM

(75) Inventors: Hiroaki Kimura, Tokyo (JP); Shingo Izawa, Tokyo (JP); Tsunemichi Ozaki, Yokohama (JP); Noriaki Konishi, Yokohama (JP)

(73) Assignee: KDDI Corporation, Tokyo (JP)

( * ) Notice: Subject to any disclaimer, the term of this patent is extended or adjusted under 35 U.S.C. 154(b) by 483 days.

(21) Appl. No.: 12/095,390

(22) PCT Filed: Nov. 27, 2006

(86) PCT No.: PCT/JP2006/323590
§ 371 (c)(1),
(2), (4) Date: May 29, 2008

(87) PCT Pub. No.: WO2007/063803
PCT Pub. Date: Jun. 7, 2007

(65) Prior Publication Data
US 2009/0303911 A1   Dec. 10, 2009

(30) Foreign Application Priority Data
Nov. 30, 2005   (JP) ................. 2005-346451

(51) Int. Cl.
*H04L 12/28* (2006.01)
(52) U.S. Cl.
USPC ........................................ 370/390

(58) Field of Classification Search .......... 370/390
See application file for complete search history.

(56) References Cited

U.S. PATENT DOCUMENTS

2002/0138646 A1* 9/2002 Tsuboi et al. ................ 709/238
2003/0039237 A1* 2/2003 Forslow ....................... 370/352
(Continued)

FOREIGN PATENT DOCUMENTS

JP   10-247916 A   9/1998
JP   11-313290 A   11/1999
(Continued)

OTHER PUBLICATIONS

"A Coding and Transmission Control Scheme for Video Multicast" by Sakazawa et al. In the Journal of the Institute of Image Information and Television Engineers, Japan, Jun. 20, 1998 vol. 52 p. 863-870.*

(Continued)

*Primary Examiner* — Ayaz Sheikh
*Assistant Examiner* — Hai-Chang Hsiung
(74) *Attorney, Agent, or Firm* — Westerman, Hattori, Daniels & Adrian, LLP (57) ABSTRACT

The content receiving unit (201) receives IP packets (Ethernet frames) that include broadcast content. The assigning unit (202) assigns, based on a given method, received Ethernet frames to the A-layer and the B-layer that are different digital broadcast layers. The Ethernet frames assigned to the A-layer are encapsulated by the A-layer processing unit (203), and transmitted to a terrestrial digital broadcast network together with encapsulation format information. Meanwhile, the Ethernet frames assigned to the B-layer are encapsulated by the B-layer processing unit (204), and transmitted to the terrestrial digital broadcast network together with encapsulation format information.

5 Claims, 6 Drawing Sheets

U.S. PATENT DOCUMENTS

| | | | |
|---|---|---|---|
| 2003/0162495 A1* | 8/2003 | Yonemoto et al. | 455/7 |
| 2005/0123284 A1* | 6/2005 | Kikuchi et al. | 386/125 |
| 2007/0242701 A1* | 10/2007 | Lee et al. | 370/487 |

FOREIGN PATENT DOCUMENTS

| | | |
|---|---|---|
| JP | 2000-115119 A | 4/2000 |
| JP | 2001-078180 A | 3/2001 |
| JP | 2002-027009 A | 1/2002 |
| JP | 2003-78830 A | 3/2003 |
| JP | 2005-223548 A | 8/2005 |

OTHER PUBLICATIONS

International Search Report of PCT/JP2006/323590, date of mailing Jan. 9, 2007.

Notification Concerning Transmittal of International Preliminary Report on Patentability (PCT/IB/338) dated Jun. 12, 2008, with Forms PCT/IB/326 and PCT/IB/373 issued in corresponding International application No. PCT/JP2006/323590 filed Nov. 27, 2006, with English translation of Written Opinion of the International Searching Authority (Form PCT/ISA/237).

Japanese Office Action dated Aug. 31, 2010, issued in corresponding Japanese Patent Application No. 2005-346451, with a partial English language translation thereof.

Shigeyuki Sakazawa et al., "A Coding and Transmission Control Scheme for Video Multicast", The Journal of The Institute of Image Information and Television Engineers, vol. 52, No. 6, pp. 863-870, Jun. 20, 1998, with a partial English language translation thereof.

* cited by examiner

BROADCAST-CONTENT TRANSMITTING APPARATUS, BROADCAST-CONTENT RECEIVING APPARATUS, BROADCAST-CONTENT TRANSMITTING METHOD, BROADCAST-CONTENT RECEIVING METHOD, AND PROGRAM

TECHNICAL FIELD

The present invention relates to a broadcast-content transmitting apparatus and a broadcast-content transmitting method that transmit broadcast content for terrestrial digital broadcasts, and a broadcast-content receiving apparatus, a broadcast-content receiving method, and a program that receive broadcast content for the terrestrial digital broadcasts.

BACKGROUND ART

Conventionally, the digitalization of programs broadcasted through a broadcast network, such as that for terrestrial broadcasts, is progressing and the distribution of broadcast content by utilizing high-capacity and high-speed properties of communication networks, such as the Internet, has been gaining momentum.

In digital broadcasts of recent years, data can be transferred through bidirectional communication between a transmitter and a receiver. This technology enables data to be transferred through the Internet, and a digital-broadcast receiving apparatus receiving a digital broadcast obtains information concerning a bidirectional web server relevant to the corresponding broadcast content, and communicates with the web server through the Internet, etc. (see, for example, Patent Document 1 below).

Patent Document 1: Japanese Patent Application Laid-open Publication No. 2003-78830

DISCLOSURE OF INVENTION

Problem to be Solved by the Invention

However, a method of transmitting content input as IP packets and the like, using a broadcast wave of a digital broadcast, has not been conventionally disclosed. Therefore, a specific method for transmitting the broadcast content via a digital broadcast network has been required.

To solve the above problems arising from conventional technologies, it is an object of the present invention to transmit broadcast content to be transmitted to a receiver via a terrestrial digital broadcast network.

Means for Solving Problem

To solve the above problems and achieve an object, a broadcast-content transmitting apparatus according to one aspect of the invention includes a receiving unit that receives IP packets that include broadcast content; an assigning unit that assigns each of the IP packets received by the receiving unit to any one of two layers according to a given method; an encapsulating unit that encapsulates, into a given format, each of the IP packets assigned by the assigning unit; an encapsulation-format-information generating unit that generates encapsulation format information concerning the given format; and a transmitting unit that transmits the IP packets encapsulated by the encapsulating unit together with the encapsulation format information to a terrestrial digital broadcast network.

A broadcast-content transmitting apparatus according to another aspect of the invention is characterized by the assigning unit assigning the IP packets based on a prescribed pattern.

A broadcast-content transmitting apparatus according to another aspect of the invention is characterized by the assigning unit detecting an IP address of each of the IP packets, comparing the IP address detected with assignment information prescribed for each IP address, and assigning the IP packets based on a comparison result.

A broadcast-content receiving apparatus according to another aspect of the invention includes a receiving unit that receives, via a terrestrial digital broadcast network, IP packets each assigned to any one of two layers and encapsulated, and encapsulation format information of the IP packets; an encapsulation-format-information analyzing unit that analyzes the encapsulation format information of the IP packets; a decapsulating unit that decapsulates the IP packets based on an analysis result by the encapsulation-format-information analyzing unit; and a merging unit that merges the IP packets decapsulated by the decapsulating unit.

A broadcast-content transmitting method according to another aspect of the invention includes a receiving step of receiving IP packets that include broadcast content; an assigning step of assigning each of the IP packets received at the receiving step to any one of two layers according to a given method; an encapsulating step of encapsulating, into a given format, each of the IP packets assigned at the assigning step; an encapsulation-format-information generating step of generating encapsulation format information concerning the given format; and a transmitting step of transmitting the IP packets encapsulated at the encapsulating step together with the encapsulation format information to a terrestrial digital broadcast network.

A broadcast-content transmitting method according to another aspect of the invention is characterized by the assigning step including assignment of the IP packets based on a prescribed pattern.

A broadcast-content transmitting method according to another aspect of the invention is characterized by the assigning step including detection of an IP address of each of the IP packets, comparison of the IP address detected with assignment information prescribed for each IP address, and assignment of the IP packets based on a comparison result.

A broadcast-content receiving method according to another aspect of the invention includes a receiving step of receiving, via a terrestrial digital broadcast network, IP packets each assigned to any one of two layers and encapsulated, and encapsulation format information of the IP packets; an encapsulation-format-information analyzing step of analyzing the encapsulation format information of the IP packets; a decapsulating step of decapsulating the IP packets based on an analysis result at the encapsulation-format-information analyzing step; and a merging step of merging the IP packets decapsulated at the decapsulating step.

A program according to the invention causes a computer to execute the method according to any one of the previous aspects of the invention.

Effect of the Invention

According to the broadcast-content transmitting apparatus and the broadcast-content transmitting method of the present invention, broadcast content to be transmitted can be transmitted to a receiver via a terrestrial digital broadcast network. Particularly, an effect of assigning broadcast content acquired via a network such as a LAN to two layers, and independently transmitting each of the assigned broadcast content items to the receiver via the terrestrial digital broadcast network can be achieved.

EXPLANATIONS OF LETTERS OR NUMERALS 100 application server
101 broadcast-content transmitting apparatus
102 broadcast-content receiving apparatus
201 content receiving unit
202 assigning unit
203, 503 A-layer processing unit
204, 504 B-layer processing unit
211, 214 encapsulating unit
212, 215 encapsulation-format-information generating unit

BEST MODE(S) FOR CARRYING OUT THE INVENTION

Referring to the accompanying drawings, exemplary embodiments of a broadcast-content transmitting apparatus, a broadcast-content receiving apparatus, a broadcast-content transmitting method, a broadcast-content receiving method, and a program according to the present invention are explained in detail below.
(Overview of Broadcast-Content Transmitting Apparatus and Broadcast-Content Receiving Apparatus)

An overview of a broadcast-content transmitting apparatus and a broadcast-content receiving apparatus according to an embodiment of the present invention is explained.

Figure 1:
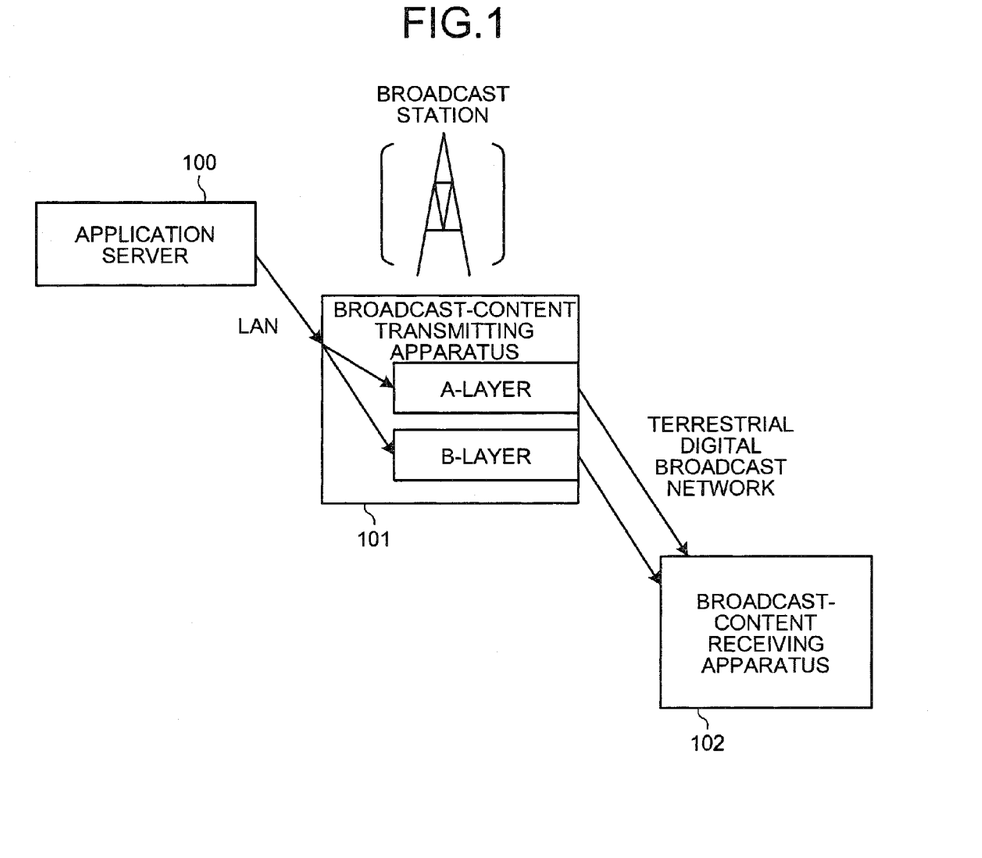
FIG. 1 is a schematic for explaining an overview of a broadcast-content transmitting apparatus and a broadcast-content receiving apparatus according to an embodiment of the present invention.

FIG. 1 is a schematic for explaining an overview of the broadcast-content transmitting apparatus and the broadcast-content receiving apparatus according to the embodiment of the present invention. A broadcast-content transmitting apparatus 101 acquires IP packets (for example, Ethernet frames) including broadcast content from an application server 100 via a network such as a LAN.

The broadcast-content transmitting apparatus 101 assigns the acquired Ethernet frames to an A-layer and a B-layer of a digital broadcast according to the regulations of the ARIB (Association of Radio Industries and Businesses) (an assigning method will be explained hereinafter). The broadcast-content transmitting apparatus 101 encapsulates, into given formats, the Ethernet frames assigned to the A-layer and the Ethernet frames assigned to the B-layer separately and transmits the encapsulated frames to the terrestrial digital broadcast network. Upon transmitting Ethernet frames, the broadcast-content transmitting apparatus 101 also transmits information indicating in which format the Ethernet frames are encapsulated.

The broadcast-content receiving apparatus 102 receives the encapsulated Ethernet frames transmitted by the broadcast-content transmitting apparatus 101, and decapsulates the received Ethernet frames by referring to the information concerning the encapsulation format transmitted together with the encapsulated Ethernet frames. The broadcast-content receiving apparatus 102 merges the A-layer Ethernet frames and the B-layer Ethernet frames that are decapsulated to play the broadcast content.
(Functional Configuration of Broadcast-Content Transmitting Apparatus)

A functional configuration of the broadcast-content transmitting apparatus according to the embodiment of the present invention is explained.

Figure 2:
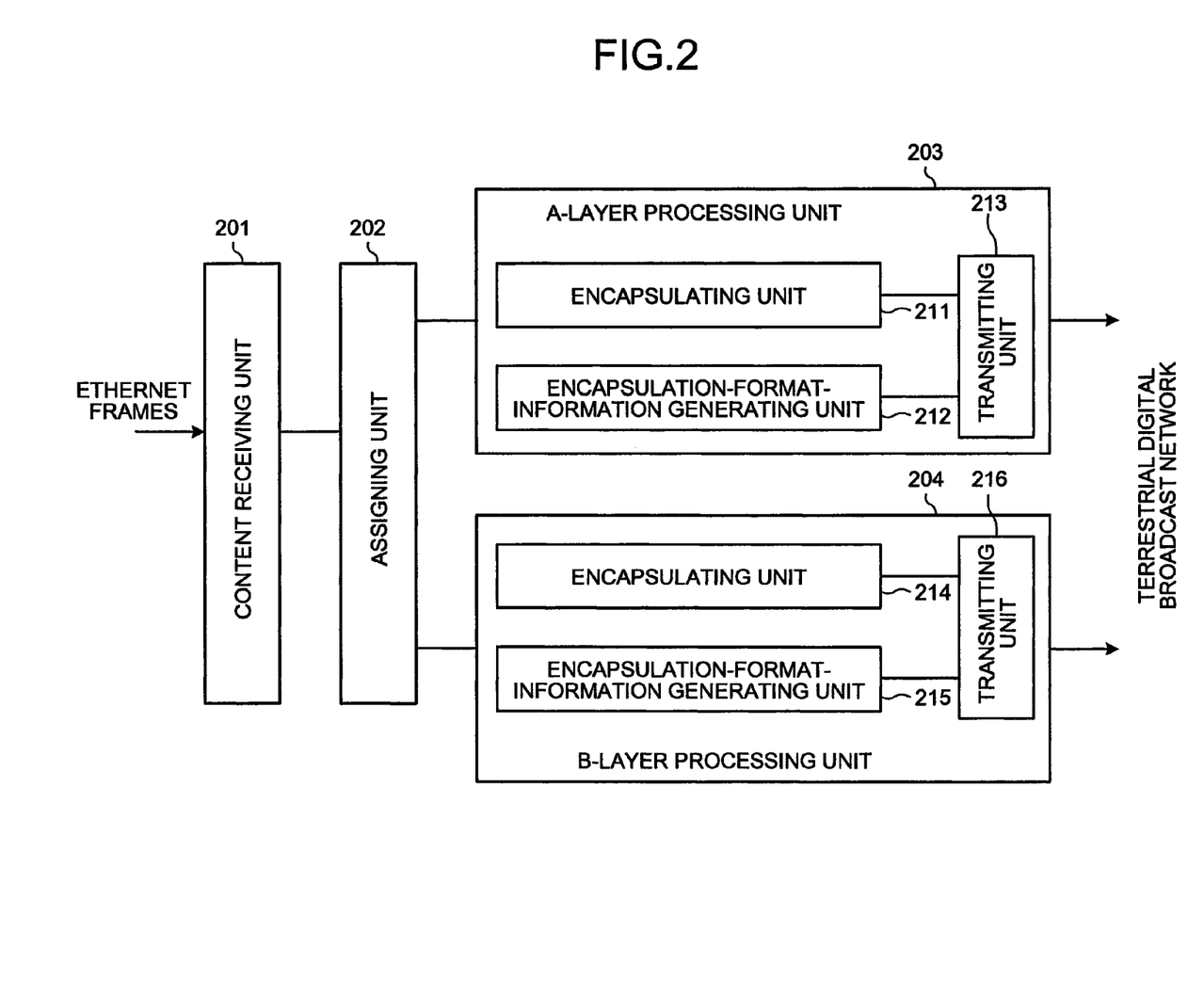
FIG. 2 is a block diagram of a functional configuration of the broadcast-content transmitting apparatus according to the embodiment of the present invention.

FIG. 2 is a block diagram of a functional configuration of the broadcast-content transmitting apparatus according to the embodiment of the present invention. A content receiving unit 201 receives Ethernet frames (IP packets) including broadcast content transmitted by the application server 100 (see FIG. 1) via a network such as a LAN. The Ethernet frames received by the content receiving unit 201 are output to an assigning unit 202.

The assigning unit 202 assigns, based on a given method, the received Ethernet frames to the A-layer and the B-layer, which are different digital broadcast layers. As the given method, a setting file in which a given assignment pattern is preliminarily set can be stored in the assigning unit 202, and the Ethernet frames can be assigned to the A-layer and the B-layer based on the assignment pattern. For example, when an assignment pattern of "ABBABBABB" is set in the setting file, the Ethernet frames are assigned to the layers of "ABBA-BBABB" sequentially in a reception order of the Ethernet frames.

When the received Ethernet frames include IP packets, it is considered that assignment is performed with reference to a source IP address or a destination IP address. In this case, for example, the setting file in which assignment information (A-layer or B-layer) corresponding to the source IP address or the destination IP address is stored in the assigning unit 202. The assigning unit 202 detects the source IP address or the destination IP address of the received Ethernet frame, compares the source IP address or the destination IP address to the assignment information in the setting file, and respectively assigns the Ethernet frame to the appropriate layer (A-layer or B-layer).

The Ethernet frames assigned to the A-layer are transmitted to an A-layer processing unit 203. The A-layer processing unit 203 includes an encapsulating unit 211, an encapsulation-format-information generating unit 212, and a transmitting unit 213. The encapsulating unit 211 encapsulates into a given format, the Ethernet frames assigned to the A-layer. The encapsulation-format-information generating unit 212 generates information concerning the format of the encapsulation performed by the encapsulating unit 211. The transmitting unit 213 transmits, to the terrestrial digital broadcast network, the Ethernet frames encapsulated by the encapsulating unit 211 and the encapsulation format information generated by the encapsulation-format-information generating unit 212.

The encapsulation of the Ethernet frames performed by the encapsulating unit 211 is by MPE or ULE, for example. The encapsulation-format-information generating unit 212 generates information concerning the format of the encapsulation performed by the encapsulating unit 211 in "Sub_format-_type_value" of an "ES_loop" section of a PMT table included in PSI/SI data, for example. The generated encapsulation format information is transmitted to the broadcast-content receiving apparatus 102 (see FIG. 1), and referred to by the broadcast-content receiving apparatus 102 upon decapsulation of the Ethernet frames.

Meanwhile, the Ethernet frames assigned to the B-layer are output to a B-layer processing unit 204. The B-layer processing unit 204 includes an encapsulating unit 214, an encapsulation-format-information generating unit 215, and a transmitting unit 216. The encapsulating unit 214 encapsulates, into a given format, the Ethernet frames assigned to the B-layer. The encapsulation-format-information generating unit 215 generates information concerning the format of the encapsulation performed by the encapsulating unit 214.

The transmitting unit 216 transmits, to the terrestrial digital broadcast network, the Ethernet frames encapsulated by the encapsulating unit 214 and the encapsulation format information generated by the encapsulation-format-information generating unit 215. The format of the encapsulation performed by the encapsulating unit 214 is similar to that performed by the encapsulating unit 211. The encapsulation format information generated by the encapsulation-format-information generating unit 215 is similar to that generated by encapsulation-format-information generating unit 212.

In the embodiment, the format of the encapsulation of the Ethernet frames performed by the encapsulating unit 211 of the A-layer processing unit 203 may be different from that executed by the encapsulating unit 214 of the B-layer processing unit 204.

(Broadcast-Content Transmitting Processing)

Broadcast-content transmitting processing according to the embodiment of the present invention is explained.

Figure 3:
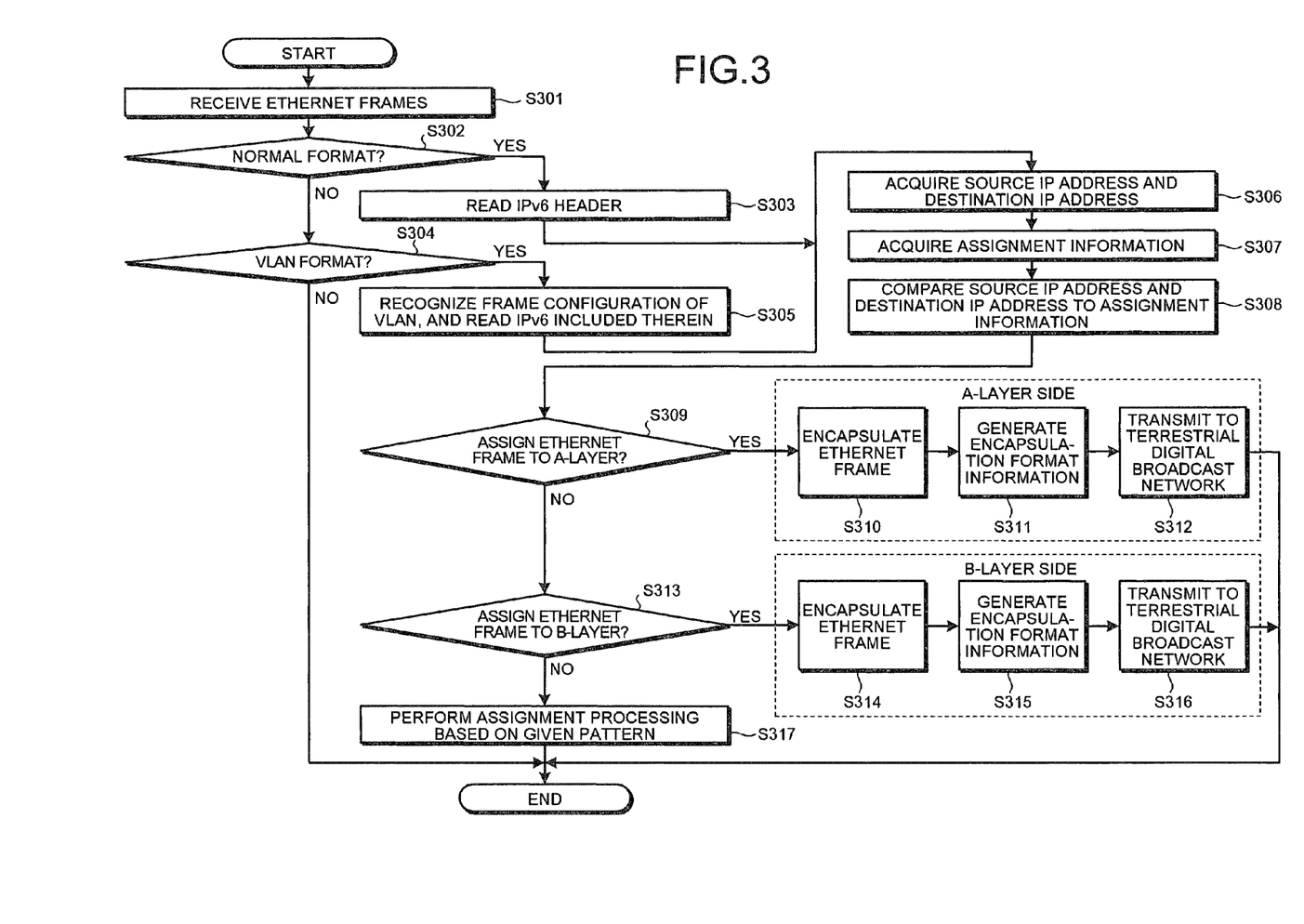
FIG. 3 is a flowchart of broadcast-content transmitting processing performed by the broadcast-content transmitting apparatus according to the embodiment of the present invention.

FIG. 3 is a flowchart of broadcast-content transmitting processing performed by the broadcast-content transmitting apparatus according to the embodiment of the present invention.

As shown in the flowchart of FIG. 3, the content receiving unit 201 (see FIG. 2) receives an Ethernet frame including broadcast content (step S301).

The assigning unit 202 (see FIG. 2) judges whether the Ethernet frame is in a normal format (step S302). When the Ethernet frame is in the normal format (step S302: YES), an IPv6 header of the Ethernet frame is read (step S303), and the processing proceeds to step S306.

Meanwhile, when the Ethernet frame is not in the normal format (step S302: NO), the assigning unit 202 judges whether the Ethernet frame is in the VLAN format (step S304). When the Ethernet frame is in the VLAN format (step S304: YES), a frame configuration of the VLAN is recognized, and the IPv6 included therein is read (step S305), and the processing proceeds to step S306.

Meanwhile, when the Ethernet frame is not in the VLAN format (step S304: NO), the processing ends.

The assigning unit 202 acquires a source IP address and a destination IP address of the Ethernet frame (step S306). The source IP address and the destination IP address are preliminarily set by the application server 100 (see FIG. 1) that has transmitted the Ethernet frame. The assigning unit 202 acquires assignment information (step S307). The assignment information is layer information (A-layer or B-layer) preliminarily set in the setting file included in the assigning unit 202 and correlated with each source IP address or each destination IP address. The assigning unit 202 compares the source IP address and the destination IP address of the Ethernet frame to the assignment information (step S308).

The assigning unit 202 judges whether to assign the Ethernet frame to the A-layer (step S309). When the source IP address and the destination IP address are included in an A-layer side of the assignment information, the Ethernet frame is assigned to the A-layer. When the assignment information includes only the source IP address or the destination IP address, the Ethernet frame is assigned to the A-layer if the address included matches accordingly. When the Ethernet frame is assigned to the A-layer (step S309: YES), the encapsulating unit 211 (see FIG. 2) encapsulates the Ethernet frame for the A-layer into the given format (step S310). The encapsulation-format-information generating unit 212 (see FIG. 2) generates information concerning the format of the encapsulation performed by the encapsulating unit 211 (step S311).

The generated encapsulation format information is information for notifying the broadcast-content receiving apparatus 102 (see FIG. 1) in which format the encapsulating unit 211 has encapsulated the Ethernet frame. The transmitting unit 213 (see FIG. 2) transmits the Ethernet frame encapsulated for the A-layer and the encapsulation format information to the terrestrial digital broadcast network (step S312).

Meanwhile, when the Ethernet frame is not assigned to the A-layer at step S309 (step S309: NO), the assigning unit 202 judges whether to assign the Ethernet frame to the B-layer (step S313). When the source IP address and the destination IP address are included in a B-layer side of the assignment information, the Ethernet frame is assigned to the B-layer. When the assignment information includes only the source IP address or the destination IP address, the Ethernet frame is assigned to the B-layer if the address includes matches accordingly. When the Ethernet frame is assigned to the B-layer (step S313: YES), the encapsulating unit 214 (see FIG. 2) encapsulates the Ethernet frame for the B-layer into the given format (step S314). The encapsulation-format-information generating unit 215 (see FIG. 2) generates information concerning the format of the encapsulation performed by the encapsulating unit 214 (step S315).

The generated encapsulation format information is information for notifying the broadcast-content receiving apparatus 102 (see FIG. 1) in which format the encapsulating unit 214 has encapsulated the Ethernet frame. The transmitting unit 216 (see FIG. 2) transmits the Ethernet frame encapsulated for the B-layer and the encapsulation format information to the terrestrial digital broadcast network (step S316).

Meanwhile, when the Ethernet frame is not assigned to the B-layer at step S313 (step S313: NO), assignment processing based on a given assignment pattern (explained in detail hereinafter) is executed (step S317).

Figure 4:
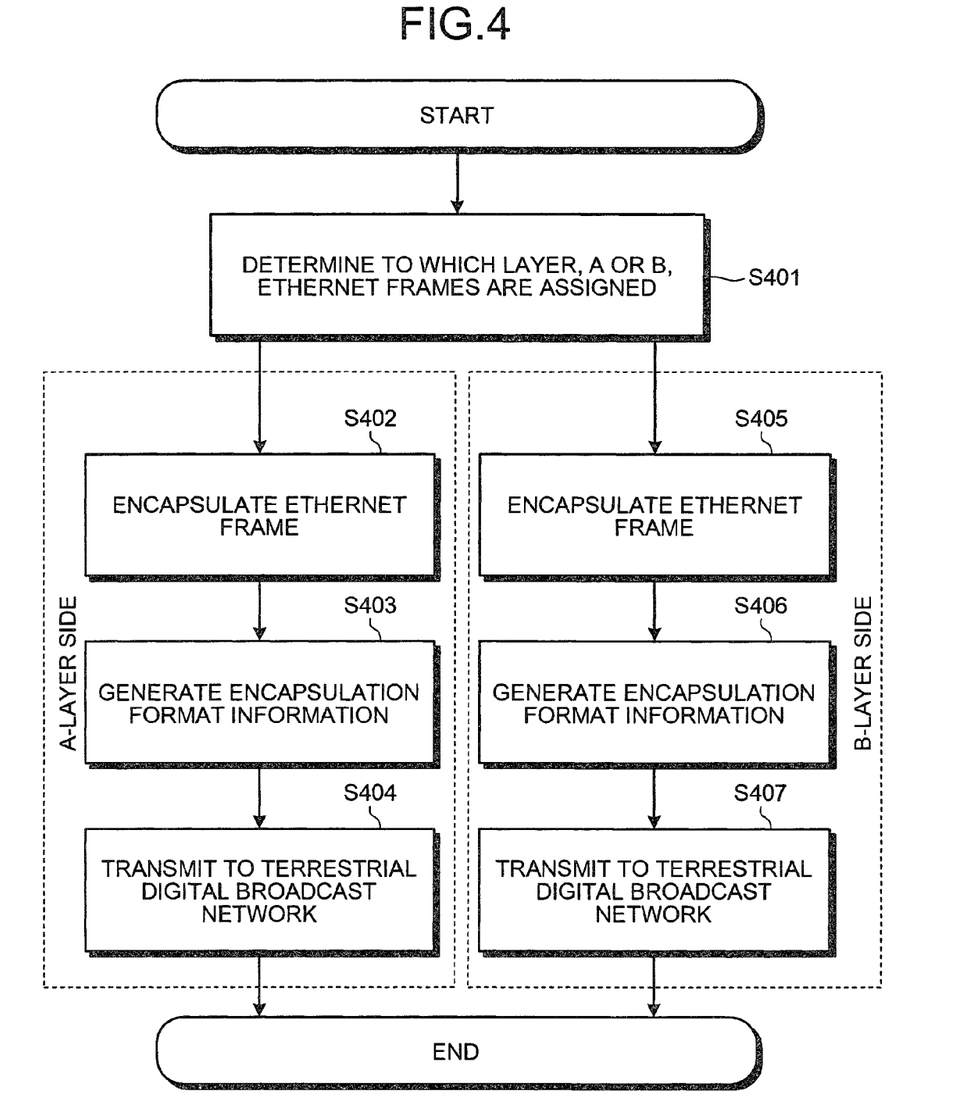
FIG. 4 is a flowchart of assignment processing based on a given assignment pattern shown in FIG. 3 (step S317)

FIG. 4 is a flowchart of assignment processing based on the given assignment pattern shown in FIG. 3 (step S317). In this processing, the received Ethernet frame is assigned to the A-layer or the B-layer based only on the assignment pattern set in the setting file provided in the assigning unit 202 (see FIG. 2).

As shown in the flowchart of FIG. 4, the assigning unit 202 (see FIG. 2) determines to which layer, the A-layer or the B-layer, the Ethernet frame that is not subjected to the assignment processing based on the source IP address or the destination IP address is assigned (step S401). As explained above, the assigning unit 202 assigns the Ethernet frame to the A-layer or the B-layer based on the assignment pattern preliminarily set in the setting file provided therein. For example, when the assignment pattern of "ABBABBABB" is set in the setting file, the Ethernet frames are sequentially assigned to the layers of "ABBABBABB" according to a reception order of the Ethernet frames.

The encapsulating unit 211 (see FIG. 2) encapsulates, into the given format, the Ethernet frame assigned to the A-layer (step S402). The encapsulation-format-information generating unit 212 (see FIG. 2) generates information concerning the format of the encapsulation performed by the encapsulating unit 211 (step S403).

The generated encapsulation format information is information for notifying the broadcast-content receiving apparatus 102 (see FIG. 1) in which format the encapsulating unit 211 has encapsulated the Ethernet frame. The transmitting unit 213 (see FIG. 2) transmits the encapsulated A-layer Ethernet frame and the encapsulation format information to the terrestrial digital broadcast network (step S404).

The encapsulating unit 214 (see FIG. 2) encapsulates, into the given format, the Ethernet frame assigned to the B-layer (step S405). The encapsulation-format-information generating unit 215 (see FIG. 2) generates information concerning the format of the encapsulation performed by the encapsulating unit 214 (step S406).

The generated encapsulation format information is information for notifying the broadcast-content receiving apparatus 102 (see FIG. 1) in which format the encapsulating unit 214 has encapsulated the Ethernet frame. The transmitting unit 216 (see FIG. 2) transmits the encapsulated B-layer Ethernet frame and the encapsulation format information to the terrestrial digital broadcast network (step S407).

According to the broadcast-content transmitting apparatus of the embodiment, by the aforementioned processing, the input Ethernet frames can be assigned to the A-layer or the B-layer based on a source IP address or a destination IP address, thereby further enabling transmission of the broadcast content by designating different destination IP addresses.

Particularly, by the assignment based on the source IP address or the destination IP address, traffic during an IP session can be fixed to the A-layer or the B-layer, thereby enabling establishment of IP communication even when the reception condition is so poor that only reception at one layer is performed. If the assignment is not performed, high packet loss may occur, and the IP communication may not be maintained when a receiver only performs reception at one layer. However, the above configuration can prevent such problems.

In some cases, processing delays are different between the A-layer and the B-layer with only the assignment based on a given pattern, and the arrival order of the packets may change. According to the embodiment, traffic can be assigned to different layers for each session, maintaining the arrival order of the packets in one session.

The assignment based on a pattern is required when the A-layer and the B-layer are utilized as one session. For example, assuming that the A-layer and the B-layer have bandwidths of 330 kbps and 660 kbps, respectively, and a session of 900 kbps is to be broadcasted, the A-layer and the B-layer must be treated as one trunk. To achieve this, the assignment based on a pattern is utilized.

(Functional Configuration of Broadcast-Content Receiving Apparatus)

A functional configuration of the broadcast-content receiving apparatus is explained.

Figure 5:
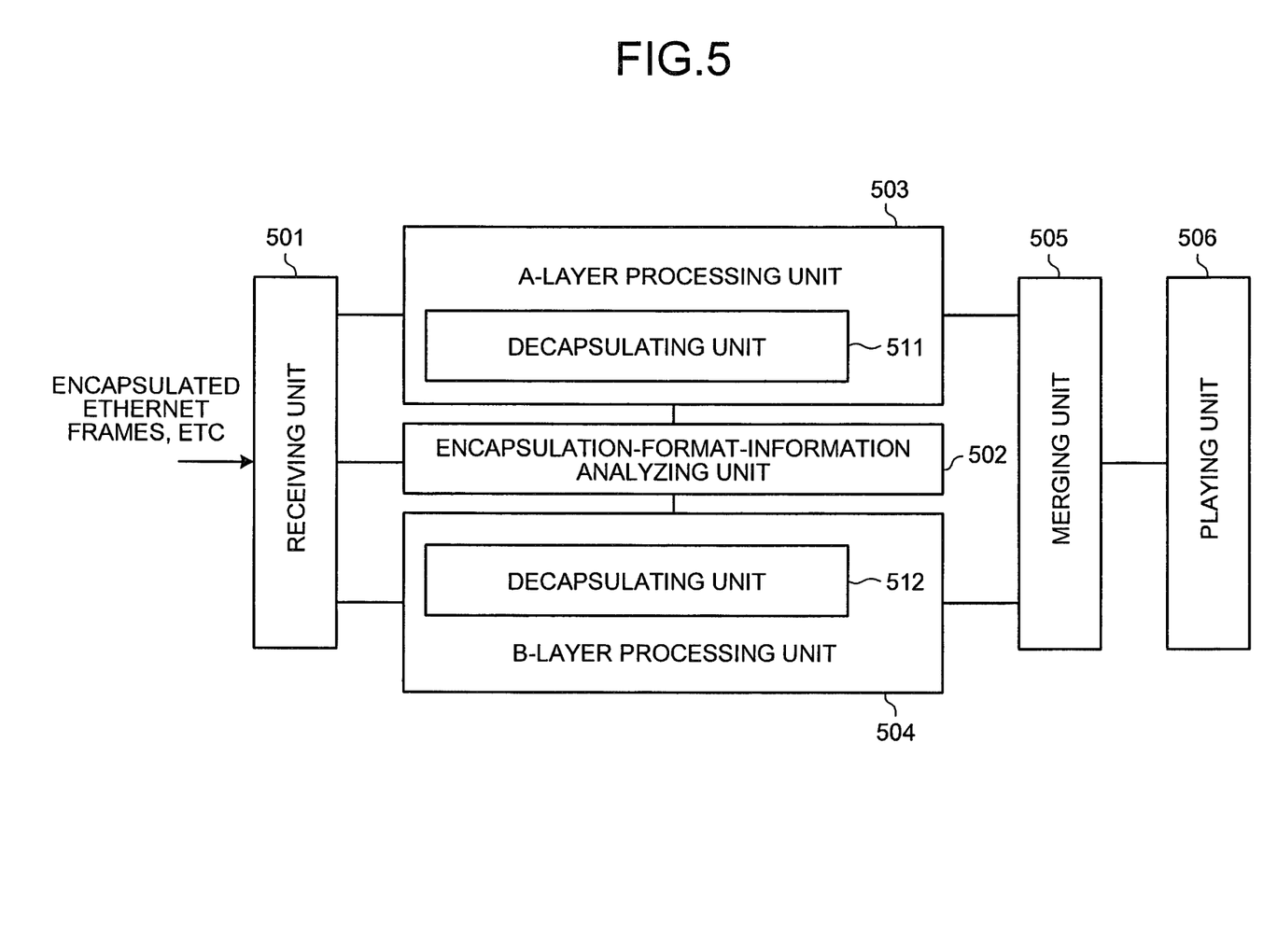
FIG. 5 is a block diagram of a functional configuration of the broadcast-content receiving apparatus according to the embodiment of the present invention.

FIG. 5 is a block diagram of the functional configuration of the broadcast-content receiving apparatus according to the embodiment of the present invention. A receiving unit 501 receives encapsulated Ethernet frames (IP packets) and encapsulation format information of the Ethernet frames that have been transmitted by the broadcast-content transmitting apparatus 101 (see FIGS. 1 and 2).

The encapsulation format information received by the receiving unit 501 is output to an encapsulation-format-information analyzing unit 502. The encapsulated Ethernet frames received by the receiving unit 501 are output to an A-layer processing unit 503 or a B-layer processing unit 504 according to the assigned layer.

The encapsulation-format-information analyzing unit 502 analyzes the received encapsulation format information, and judges in which format the received Ethernet frames are encapsulated. The A-layer processing unit 503 includes a decapsulating unit 511. The decapsulating unit 511 decapsulates the Ethernet frames for the A-layer based on an analysis result by the encapsulation-format-information analyzing unit 502.

The B-layer processing unit 504 includes a decapsulating unit 512. The decapsulating unit 512 decapsulates the Ethernet frames for the B-layer based on an analysis result by the encapsulation-format-information analyzing unit 502. The decapsulated Ethernet frames for the A-layer and the Ethernet frames for the B-layer are output to a merging unit 505. The merging unit 505 merges the Ethernet frames for the A-layer and the Ethernet frames for the B-layer, and outputs the merged frames to a playing unit 506. The playing unit 506 plays broadcast content.

(Broadcast-Content Receiving Processing)

Broadcast-content receiving processing according to the embodiment of the present invention is explained.

Figure 6:
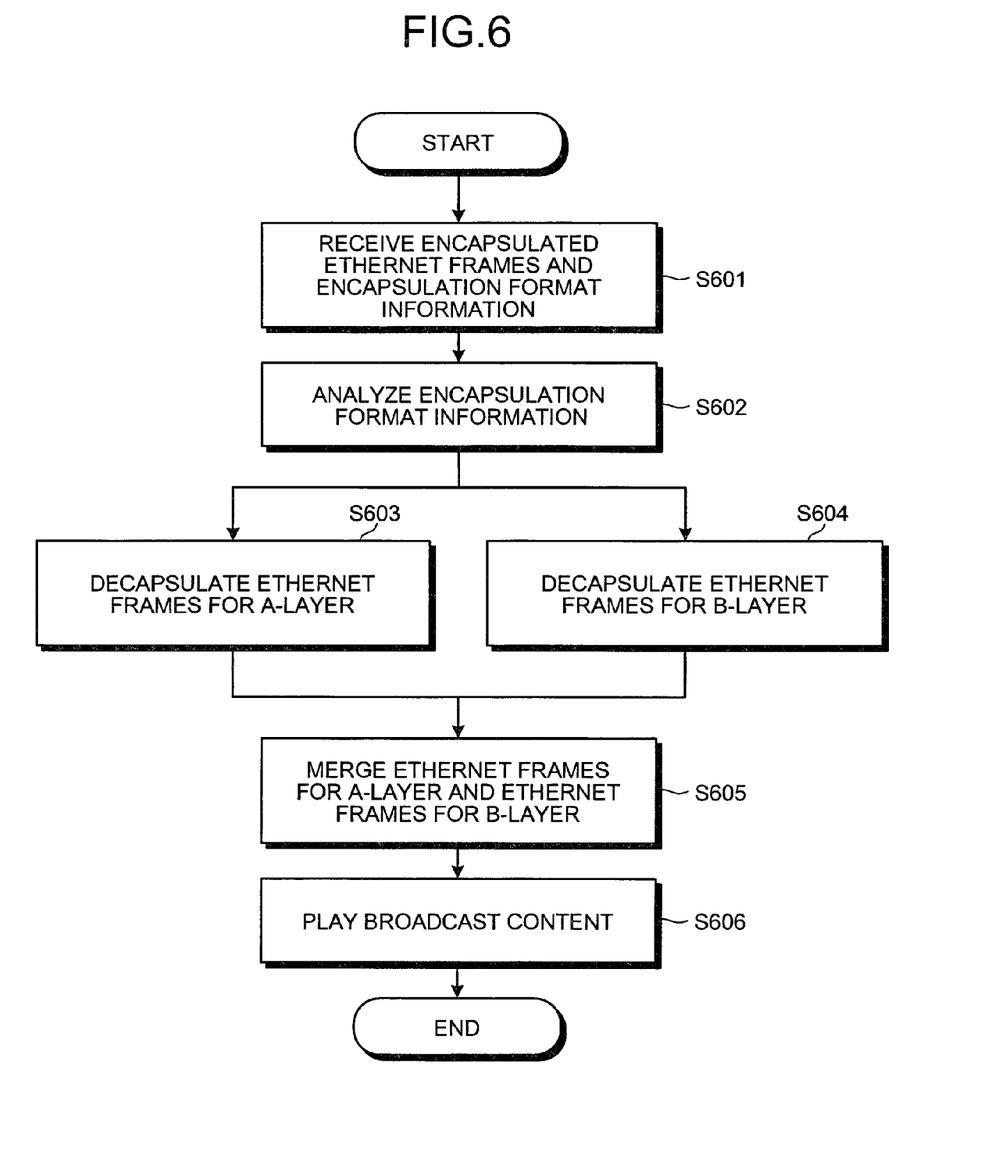
FIG. 6 is a flowchart of broadcast-content receiving processing performed by the broadcast-content receiving apparatus according to the embodiment of the present invention.

FIG. 6 is a flowchart of broadcast-content receiving processing performed by the broadcast-content receiving apparatus according to the embodiment of the present invention. As shown in the flowchart of FIG. 6, the receiving unit 501 (see FIG. 5) receives encapsulated Ethernet frames (IP packets) and encapsulation format information (step S601).

The encapsulation-format-information analyzing unit 502 (see FIG. 5) analyzes the received encapsulation format information (step S602). The decapsulating unit 511 of the A-layer processing unit 503 (see FIG. 5) decapsulates the Ethernet frames for the A-layer based on an analysis result by the encapsulation-format-information analyzing unit 502 (step S603). In conjunction with the processing at step S603, the decapsulating unit 512 of the B-layer processing unit 504 (see FIG. 5) decapsulates the Ethernet frames for the B-layer based on an analysis result by the encapsulation-format-information analyzing unit 502 (step S604). The merging unit 505 (see FIG. 5) merges the Ethernet frames for the A-layer and the Ethernet frames for the B-layer (step S605). The playing unit 506 (see FIG. 5) plays broadcast content (step S606).

According to the broadcast-content receiving apparatus of the embodiment, by the above processing, broadcast content is assigned to the A-layer or the B-layer based on a source IP address or a destination IP address. Therefore, even when a receiver performs partial reception (for example, reception only at the A-layer), IP communication service for the corresponding layer can be provided. The arrival order of packets does not change due to the assignment based on the IP address. Further by the assignment based on a pattern, broadband IP traffic can also be received at both the A-layer and the B-layer.

As explained above, according to the embodiment, broadcast content that is to be transmitted can be transmitted to a receiver via a terrestrial digital broadcast network. Specifically, a transmitter assigns Ethernet frames that are the broadcast content to the A-layer and the B-layer, and transmits the assigned Ethernet frames according to ARIB regulations as a terrestrial digital broadcast, and the receiver merges Ethernet frames for the A-layer and the B-layer to play.

The broadcast-content transmitting and receiving method explained in the present embodiment can be implemented by a computer, such as a personal computer and a workstation, executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

INDUSTRIAL APPLICABILITY

As explained above, the present invention is useful for terrestrial digital broadcasting, and suitable particularly to a transmitting apparatus transmitting a digital broadcast or a receiving apparatus since content data can be transmitted to a receiver via a digital broadcast network.

The invention claimed is:

1. A broadcast-content transmitting and receiving system comprising a broadcast-content transmitting apparatus and a broadcast-content receiving apparatus, said broadcast-content transmitting apparatus including:
   a transmitting side receiving unit that receives IP packets that include broadcast content;
   an assigning unit that assigns each of the IP packets received by the transmitting side receiving unit to one of two layers, an A layer and a B layer of a digital broadcast, according to a given method based on a prescribed pattern possessed by the assigning unit; and
   a transmitting side first layer processing unit and a transmitting side second layer processing unit to which the IP packets are assigned, each of the transmitting side first layer processing unit and the transmitting side second layer processing unit including:
   an encapsulating unit that encapsulates, into a given format, each of the IP packets assigned by the assigning unit;
   an encapsulation-format-information generating unit that generates encapsulation format information concerning the given format; and
   a transmitting unit that transmits the IP packets encapsulated by the encapsulating unit together with the encapsulation format information to a terrestrial digital broadcast network, and
   said broadcast-content receiving apparatus including:
   a receiving side receiving unit that receives, via the terrestrial digital broadcast network, the IP packets and the encapsulation format information of the IP packets from said transmitting unit;
   an encapsulation-format-information analyzing unit that analyzes the encapsulation format information of the IP packets;
   a receiving side first layer processing unit and a receiving side second layer processing unit that correspond to the two layers respectively and process the IP packets, each of the receiving side first layer processing unit and the receiving side second layer processing unit including a decapsulating unit that decapsulates the IP packets based on an analysis result by the encapsulation-format-information analyzing unit; and
   a merging unit that merges the IP packets decapsulated by the decapsulating unit,
   wherein the assigning unit detects an IP address of each of the IP packets, compares the IP address detected with assignment information prescribed for each IP address, and assigns the IP packets based on a comparison result.

2. The broadcast-content transmitting and receiving system according to claim 1, wherein the assigning unit assigns the IP packets based on the prescribed pattern possessed by the assigning unit and in order of reception of the IP packets.

3. The broadcast-content transmitting and receiving system according to claim 1, wherein the A layer and the B layer of the digital broadcast is according to the Association of Radio Industries and Businesses.

4. A broadcast-content transmitting and receiving method comprising:
   a receiving step of receiving IP packets that include broadcast content;
   an assigning step of assigning, using a computer, each of the IP packets received at the receiving step to one of two layers, an A layer and a B layer of a digital broadcast, according to a given method based on a prescribed pattern, wherein, for each of the two layers, further including:
   an encapsulating step of encapsulating, into a given format, each of the IP packets assigned at the assigning step;
   an encapsulation-format-information generating step of generating encapsulation format information concerning the given format; and
   a transmitting step of transmitting the IP packets encapsulated at the encapsulating step together with the encapsulation format information to a terrestrial digital broadcast network;
   a receiving step of receiving, via the terrestrial digital broadcast network, the IP packets and the encapsulation format information of the IP packets transmitted by said transmitting step;
   an encapsulation-format-information analyzing step of analyzing, using a computer, the encapsulation format information of the IP packets;
   a decapsulating step of decapsulating, in two layers corresponding to the two layers, the IP packets based on an analysis result at the encapsulation-format-information analyzing step; and
   a merging step of merging the IP packets decapsulated at the decapsulating step,
   wherein the assigning step includes detecting an IP address of each of the IP packets, comparing the IP address detected with assignment information prescribed for each IP address, and assigning the IP packets based on a comparison result.

5. The broadcast-content transmitting and receiving method according to claim 4, wherein the A layer and the B layer of the digital broadcast is according to the Association of Radio Industries and Businesses.

* * * * *

UNITED STATES PATENT AND TRADEMARK OFFICE
CERTIFICATE OF CORRECTION

PATENT NO.           : 8,422,496 B2
APPLICATION NO.      : 12/095390
DATED                : April 16, 2013
INVENTOR(S)          : Hiroaki Kimura et al.

It is certified that error appears in the above-identified patent and that said Letters Patent is hereby corrected as shown below:

On the title page, Item (75), 2<sup>nd</sup> Inventor;
Change

"Shingo Izawa, Tokyo (JP)"

To be

--Shingo Izawa, Shinjuku (JP)--

Signed and Sealed this
Eleventh Day of June, 2013

Teresa Stanek Rea
*Acting Director of the United States Patent and Trademark Office*